(12) United States Patent
Grove et al.

(10) Patent No.: US 8,035,756 B1
(45) Date of Patent: Oct. 11, 2011

(54) APPARATUS AND METHOD FOR TELEVISION REMOTE CONTROL WITH SIMPLE FEATURES

(75) Inventors: Curtiss C. Grove, Austin, TX (US); Rodney J. Duffin, Cedar Creek, TX (US)

(73) Assignee: KIS Company, Austin, TX (US)

( * ) Notice: Subject to any disclaimer, the term of this patent is extended or adjusted under 35 U.S.C. 154(b) by 1378 days.

(21) Appl. No.: 11/591,711

(22) Filed: Nov. 2, 2006

Related U.S. Application Data (60) Provisional application No. 60/732,557, filed on Nov. 2, 2005.

(51) Int. Cl.
*H04N 5/44* (2006.01)
(52) U.S. Cl. ........................................ 348/734
(58) Field of Classification Search ............ 348/734, 348/725; 340/825.69, 825.72, 12.22–12.55; H04N 5/44
See application file for complete search history.

(56) References Cited

U.S. PATENT DOCUMENTS

| | | | |
|---|---|---|---|
| 4,843,635 A * | 6/1989 | Okazaki | 348/734 |
| 6,256,296 B1 * | 7/2001 | Ruziak et al. | 370/277 |
| 2003/0103168 A1 * | 6/2003 | Lamb | 348/734 |

* cited by examiner

*Primary Examiner* — Sherrie Hsia
(74) *Attorney, Agent, or Firm* — Rick B. Yeager (57) ABSTRACT

A simplified television remote control device with limited control features for on/off, channel selection, and volume. Volume and channel control are provided as relatively large luminescent knobs which can be turned clockwise or counterclockwise. The housing is tapered so that its pointing direction can be determined by feel. The device self-learns the limited control features from an old remote control device for the television by placing the old device nose-to-nose with the simplified device and pressing a specific sequence of controls on the old device. A photo diode senses the infrared command signals from the old device and associates those commands with the control features of the simplified device.

12 Claims, 10 Drawing Sheets

APPARATUS AND METHOD FOR TELEVISION REMOTE CONTROL WITH SIMPLE FEATURES

RELATED APPLICATIONS

This non-provisional patent application is related to U.S. Provisional Patent Application No. 60/732,557 filed Nov. 2, 2005, and claims the benefit of that filing date.

FIELD OF INVENTION

This patent application relates to a simplified television remote control device and method. The device has a minimum number of controls, and is particularly suitable for use without reading glasses or in the dark.

BACKGROUND

Prior art television remote control devices typically include numerous features and small buttons which are confusing and difficult to use for many people. There is a need for a remote control device providing the minimum essential, and greatly simplified, television controls.

Many prior art devices use single up or down arrows for changing channel or television volume. It is often difficult to determine, particularly in the dark, which buttons control the volume and which buttons control the channel. There is a need to provide remote control devices where the volume and channel controls are easily distinguishable, and to provide devices where the controls are knobs rather than arrows.

SUMMARY OF INVENTION

The current invention provides a simple device with remote controls that are intuitive by their appearance and arrangement and simple to operate. This Slicker Clicker® control device is useful for viewers who need reading glasses to operate prior art control devices, and to parents who wish to provide a limited set of viewing options for children.

In one embodiment, the controller includes nothing more than one button for TV on and TV off, a first knob for channel up or down, and a second knob for volume control.

The device uses large-scale control features, and rejects the typical practice of miniaturization or the inclusion of seldom-used functions. The device is designed to be simple enough to use without instruction or user manuals.

In one embodiment, the invention includes a true "learning" feature that is totally independent of all codes typically required to adapt a third-party remote so as to operate a given television brand and model.

An intuitive shape and descriptive graphics are provided to indicate the direction that the device should be pointed. In one example, the device has a distinct taper so that the front of the device is narrower than the rear of the device.

In another embodiment, large numerals are provided to assist in channel selection. In one example, large numerals such as 1-10 are provided around the base of the channel control knob, so that each number corresponds to one of several pre-selected favorite channels. In this example, a cable provider may offer dozens of stations, but the viewer might only have a set of a few stations that are preferred. By including only these stations of interest, the viewer can dramatically simplify the process of selecting a desired channel.

In another embodiment, proprietary software is provided for a personal computer to create a diary of the channel numbers for favorite programs to be loaded into the Slicker Clicker. When the television is turned on, the Slicker Clicker's internal software determines the correct day and time by radio reception from station WWV and automatically displays or accesses the television channel called for in the diary. This embodiment is particularly suited for persons with cognitive deficiencies or related memory impairment.

DETAILED DESCRIPTION OF EMBODIMENT

Slicker Clicker® Remote Control Device with Two Control Knobs an ON switch, and an OFF Switch Several embodiments and examples are described below to illustrate various configurations of a simplified remote control device. Variations of these examples will be apparent to those skilled in the art, and the scope of the current invention is not limited to these specific examples.

Layout

Figure 1A:
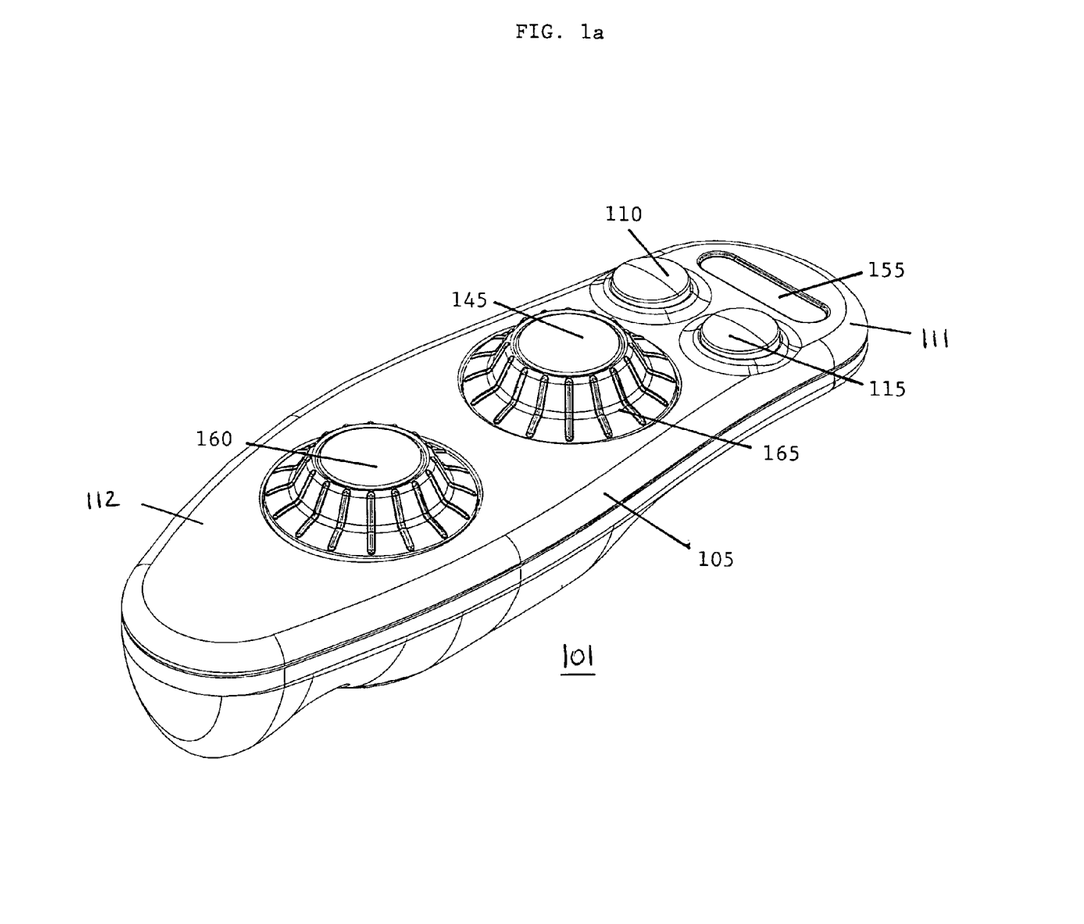
FIG. 1A is a top perspective view of an embodiment of a remote control device which features luminescent channel knobs for channel and volume control, an "On" button, and an "Off" button.
Figure 1B:
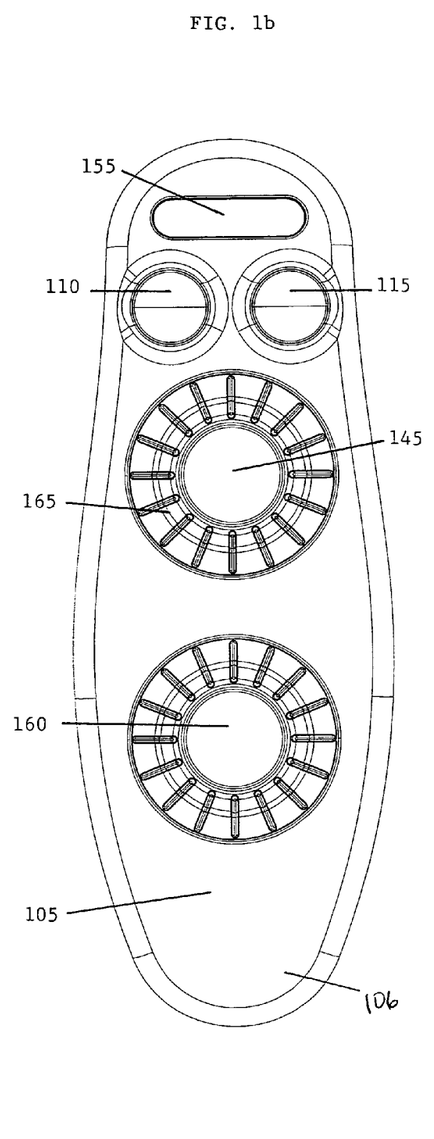
FIG. 1B is a top view of the remote control device of FIG. 1A.
Figure 1C:
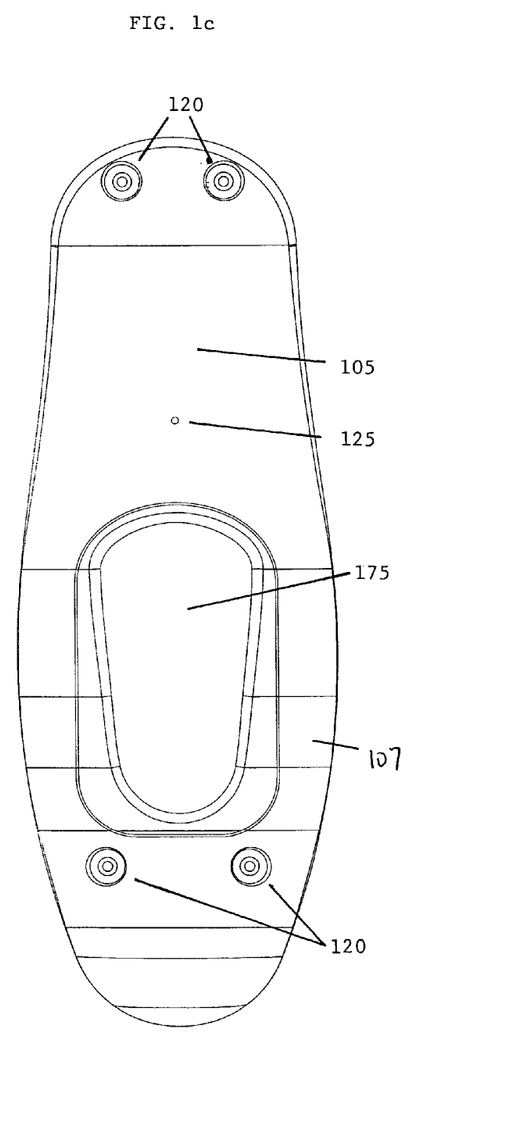
FIG. 1C is a bottom view of the remote control device of FIG. 1A.
Figure 1D:
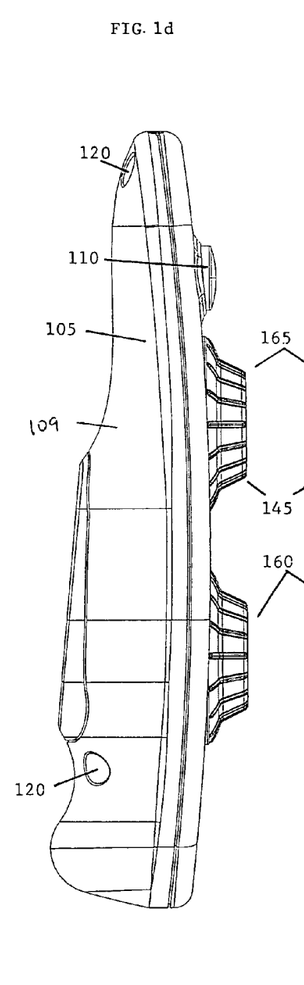
FIG. 1D is a left side view of the remote control device of FIG. 1A.
Figure 1E:
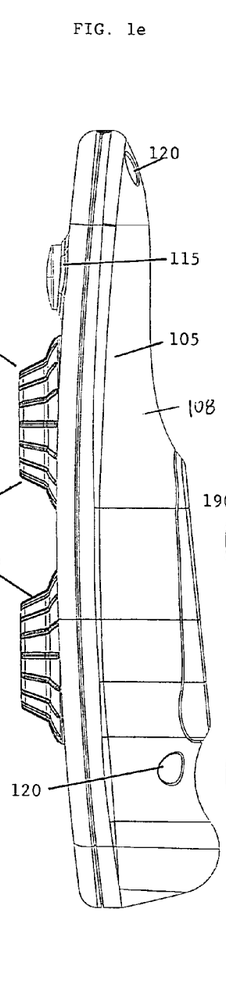
FIG. 1E is a right side view of the remote control device of FIG. 1A.
Figure 1F:
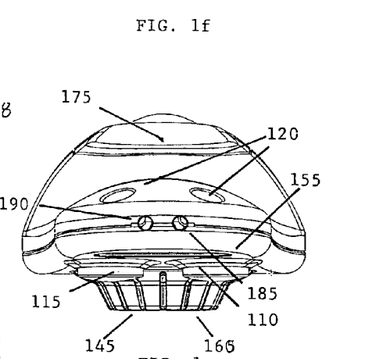
FIG. 1F is a front view of the remote control device of FIG. 1A.
Figure 1G:
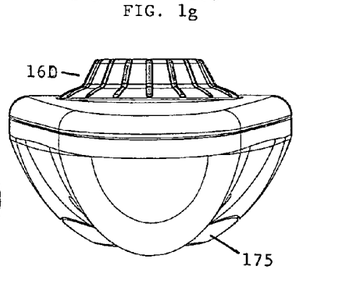
FIG. 1G is a rear view of the remote control device of FIG. 1A.

FIG. 1A is a top perspective view of an embodiment of a remote control device 101 which features luminescent knobs 165 and 160 for channel and volume control, an "On" button 110, and an "Off" button 115. FIG. 1B is a top view of the remote control device 101. FIG. 1C is a bottom view of the remote control device 101. FIG. 1D is a left side view of the remote control device 101. FIG. 1E is a right side view of the remote control device 101. FIG. 1F is a front view of the remote control device 101. FIG. 1G is a rear view of the remote control device 101. In this embodiment, the housing 105 has a top surface 106, a bottom surface 107, a right side 108, a left side 109, a front end 111 which is to be pointed toward a television set, and a rear end 112. The shape of the control device indicates by appearance and by feel, which is the top or bottom surface, and which end should be pointed at a television set (not shown) during operation. In this example, the front end is narrower than the rear end, and the viewer can feel the orientation of the knobs and buttons to determine the direction that the device should be pointed. In this example, the size is larger than most remote control devices, and has an over-all length of 8.0 inches, and width of 3.25 inches.

The larger size makes the device easier to handle, particularly for anyone with limited flexibility or dexterity. The larger size also provides a landscape suitable for oversized controls and is harder to lose, such as between the cushions of a sofa.

The housing may be provided in bright colors, with a different color for each embodiment or model number. This bright color also makes the device easier to locate than prior art devices which are typically muted black and gray.

In this example, a battery compartment is accessed by a battery compartment door 175 on the bottom surface of the housing. The battery compartment door is secured with a latch 170. In this example, two "AA" size batteries are used as a power supply. Other types of batteries or rechargeable power supplies may be used in other examples. The door to the battery compartment is oversized, so as to provide space for permanently attached, printed instructions for the learning mode. These instructions permit the device to be operated without a user manual.

In this example, the top portion of the housing is secured to the bottom portion with screws which are inserted in holes 120. In other examples, the housing may snap together or have hidden screws or other attachment means.

In this example, an internal LED 145 is provided under a control knob. When the device is in communication with a television set or another control device in a learning mode, the LED is turned on and causes the knob to glow. In other embodiments, LED indicator lights may be placed in other parts of the housing.

In this example, the front portion 132 of the device is narrower than the rear portion 130 of the device. The rear portion is sized to fit the hand of a viewer.

In this example, peel-and-stick labels are provided for optional attachment to the remote control device. Preprinted labels are provided with the names of various rooms where the associated television is located such as bedroom, kitchen, living Room, family Room, office, etc. Other labels may be left blank to permit the user to write in special room names. In this embodiment, a control device is configured for a particular television, and a viewer may own multiple control devices if there are multiple television sets in a house. In some cases, it may be desirable to have more than one control device for a single television.

Television Controls

In this embodiment there is a separate button for TV On and Off. In addition one large knob 165 controls channel up or down, and a second large knob 160 controls volume. In this example, the volume control knob is positioned to the rear of the channel control knob. In other examples, the positioning of the knobs may be reversed, or the knobs may be placed side by side.

In this example, the volume control knob is the same size as the channel control knob. In other examples, the knobs may be different sizes or textures so that the user can distinguish the knobs by feel.

In another example, the volume control knob and the channel control knob are stacked, one above the other.

In this example, the channel control knob is designed for searching, and there are no numbers provided for specifying a particular channel. Typically the user will select a small number of desired channels, such as by eliminating undesired channels, so that it is not necessary to switch through a large number of undesired channels when changing channels. This method of selecting channels eliminates the requirement that the user input the actual desired channel number on a small keypad of prior art devices.

In this example, there are no menus or sub-menus, and the device is not intended to serve multiple purposes associated with more complex television setups such as VCR, DVD, Satellite, cable, etc. However, the Slicker Clicker can operate any set-top box for such setups, within the limitations of the minimalist television controls available in the Slicker Clicker, if such a box can respond to infrared signals transmitted from a remote control.

All controls are clearly visible to persons who otherwise require bifocal or reading glasses, and they are visible in a darkened room, such as with luminescent (glow in the dark) materials in the knobs and buttons. In this example the knobs and buttons are provided as luminescent controls. In other examples, the knobs and buttons may have backlighting, or no illumination of luminescence.

A wide-angle emitter 185 is used for the infrared signal sent by the remote to the television set, so that the device may be pointed at or near the television, and does not require highly accurate pointing.

Learning Mode

The device "learns" how to operate a particular television by receiving an instruction set from the "old" remote control device previously in use, either the one that was originally supplied with the television set or some other third-party device now in use.

The learning process is independent of the television set which may be turned off or even in a different room, as learning proceeds with these steps:

1. Open the battery compartment door 175 and find printed instructions permanently affixed to the device.
2. Press the button labeled as "Reset." In this example, the reset button may be mounted on a circuit board, and is accessed by inserting a paper clip or other thin probe into the access hole 125 on the rear surface of the housing. In other examples, the reset button may be located in the battery compartment, and may be pressed by hand.
3. Place the remote previously in use on a flat surface nose to nose (front end to front end) approximately 6 inches from the Slicker Clicker. In this sequence, press the following controls on the "old" remote two times:
   Power (or On/Off)

Channel Up
Channel Down
Volume Up
Volume Down

In this example, the photo diode 190 of the current invention senses the infrared signal from the old control device, and firmware and software in the current invention associates the signal from the old device with the instructions, power on, power off, channel up, channel down, volume up, or volume down, so that the device can generate the proper commands for the television. After these commands are processed, or "learned", the current invention has the ability to determine if one of its knobs or buttons is manipulated, and to generate the appropriate control signal for the television. For instance, in this example:

When the TV On button 110 is pushed, the device generates an infrared signal that is the same or similar to the infrared signal generated by the old device when its "Power" or "On" button is pushed a first time.

When the TV Off button 115 is pushed, the device generates an infrared signal that is the same or similar to the infrared signal generated by the old device when its "Power" or "On" button is pushed a second time. That second push on the old device sends a signal to turn off the television.

When the channel control knob 165 is turned clockwise, the device generates an infrared signal that is the same or similar to the infrared signal generated by the old device when its channel Up button is pushed. One way to limit the channel choices to those channels of interest to the viewer is to use the old remote to delete all channels of no interest to the viewer, so that when the channels are learned, only the channels of interest are learned by the new device. In this example, for instance, the desired channels may skip from channel 2 to channel 52 without any reference to those channels of no user interest between channels 2 and 52.

When the channel control knob 160 is turned counterclockwise, the device generates an infrared signal that is the same or similar to the infrared signal generated by the old device when its channel Down button is pushed.

When the volume control knob 160 is turned clockwise, the device generates an infrared signal that is the same or similar to the infrared signal generated by the old device when its volume Up button is pushed.

When the volume control knob 160 is turned counterclockwise, the device generates an infrared signal that is the same or similar to the infrared signal generated by the old device when its volume Down button is pushed.

In other embodiments, the current device may also provide additional capabilities learned from the old control device such as returning to the previous channel, or adding an "Enter" command to the channel selection.

Figure 4:
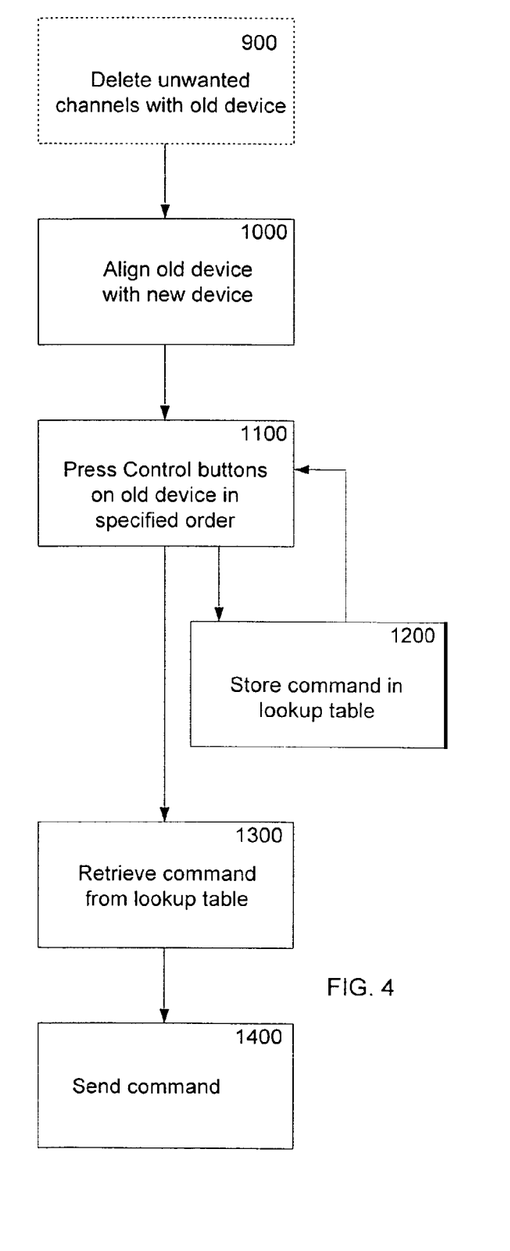
FIG. 4 is a simplified flow chart illustrating one example of a learning mode.

FIG. 4 is a simplified flow chart illustrating one example of a learning mode. In this example, at step 900, the viewer may use the old control device to delete all channels that are not of interest to the viewer. In this step, the preferred channels are typically stored in the television set or in a VCR so that when the channel up or channel down control button is pushed on the old device, only those channels of interest are accessed. Typically other channels are available, and may be accessed by directly entering a channel number on the old control device keyboard. In this example, the new control device channel control knob can be turned to sequence through the channels which are set up on the television, VCR, satellite controller, or cable controller.

In this example, only the channels of interest will be accessible by the new control device when the control channel knob is turned. In other embodiments, numeric buttons or keypad is provided to permit the viewer to input an actual channel number in addition to the favorite channels accessible by turning the channel control knob. At step 1000, the old device and new device are aligned as described above. At step 1100 and 1200, control buttons on the old device are pressed in a specific sequence, and the commands associated with those buttons are determined and stored in a lookup table. At step 1300, when a button, knob, or other control feature is used on the new device, the command associated with that button, knob, or other control feature is retrieved from the lookup table. At step 1400, the desired command is sent to the television or VCR.

Figure 5:
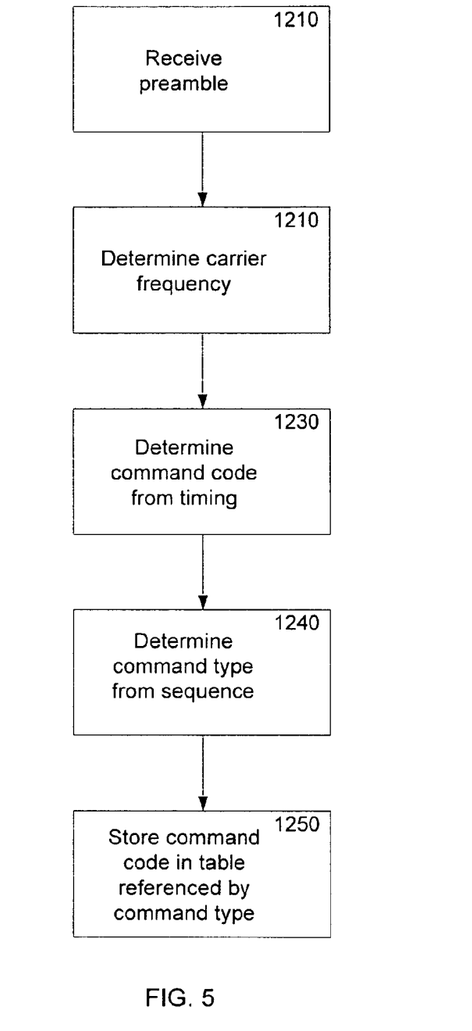
FIG. 5 is a flow chart illustrating one example of storing commands in the learning mode example of FIG. 4.

FIG. 5 is a flow chart illustrating one example of storing commands in the learning mode example of FIG. 4. The reset button is depressed on the new device to initiate the learning sequence. In this example, at step 1210 the photo diode detects the start of the signal from the old device. The signal is typically sent on a 949 nm frequency according to the standard infrared frequency for televisions. The preamble typically is a binary code set of alternating "1" and "0" bits, starting with a "1". At step 1220, a timer on the new device determines the carrier frequency, typically 15-30 KHz, by determining the times between the start and finish of the bit transmissions. At step 1230, the command code, which is also a set of "1" or "0" bits is determined from the transmission following the preamble. At step 1240, the command type, such as television on, television off, volume up, etc, is determined from the specified sequence of self-learn operations. At step 1250, the command code is stored in a lookup table according to the command type.

This is one example of a self learning operation. Other methods of determining commands and associating the commands with control knobs and buttons may be used. The self learning is practical in the current invention because of the limited number of commands on the simplified control device. The complexity, large number of features, and differences in features between prior art controllers makes it generally impractical to use self learning for those types of control device. By maintaining the simplicity in commands, the current invention permits a useful self learning from an existing television controller, VCR controller, or universal controller, and eliminates the need to know or use programming codes.

In an example of what might be called a "hybrid" learning mode, the Slicker Clicker may be used in cases for two related devices where a channel tuner, such as a VCR, is used in combination with the television set. That is, Power (On/Off) is learned from the television set
Channel Up is learned from the VCR
Channel Down is learned from the VCR
Volume Up is learned from the television set
Volume Down is learned from the television set Paging Feature In one example, there is a paging feature to locate the Slicker Clicker device when it is misplaced. A small control box (not shown) containing a call button is affixed to the associated TV, or in proximity to the television, such as with peel-and-stick tape provided. The box contains batteries and a low-power radio transmitter. When the call button is depressed, an associated device in the Slicker Clicker radio receiver responds with a loud sound to indicate its location. Proprietary software avoids confusion when there may be two or more Slicker Clicker's in use for different televisions by interrogating for a specific serial number Slicker Clicker device.
Examples of Use of Device To restrict access to channels not suitable for children, the "channel setup" feature on the old remote may be used to delete such channels from those available on the TV set. Then when children use the Slicker Clicker, the channel knob will let them select only the remaining channels not deleted on the TV set. The old remote can continue to be used to enter the number of any deleted channel for adult viewing.

To avoid confusion for certain viewers, the "channel setup" feature on the old remote may be used to delete channels of no interest from the TV set. The Slicker Clicker knob will then select only the remaining channels not deleted, thereby avoiding frustration from repeatedly scrolling through channels of no real interest to the viewer.

With only one button and two knobs, the Slicker Clicker simplifies watching TV in bed or a darkened room. The big size makes it difficult to misplace, and its large-scale controls glow in the dark, often making reading glasses unnecessary.

Figure 2A:
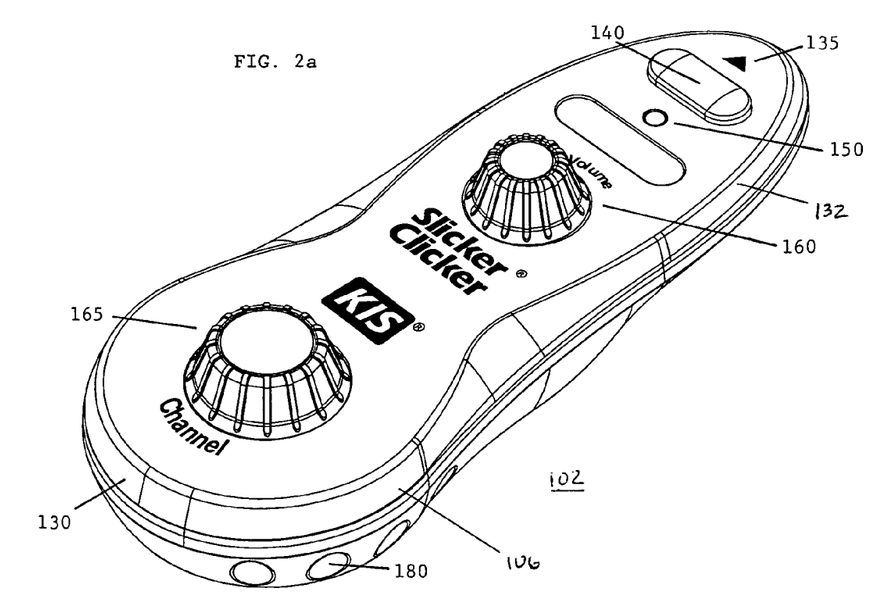
FIG. 2A is a top perspective view of an embodiment of a remote control device which features luminescent channel knobs for channel and volume control and a luminescent "On/Off" button.
Figure 2B:
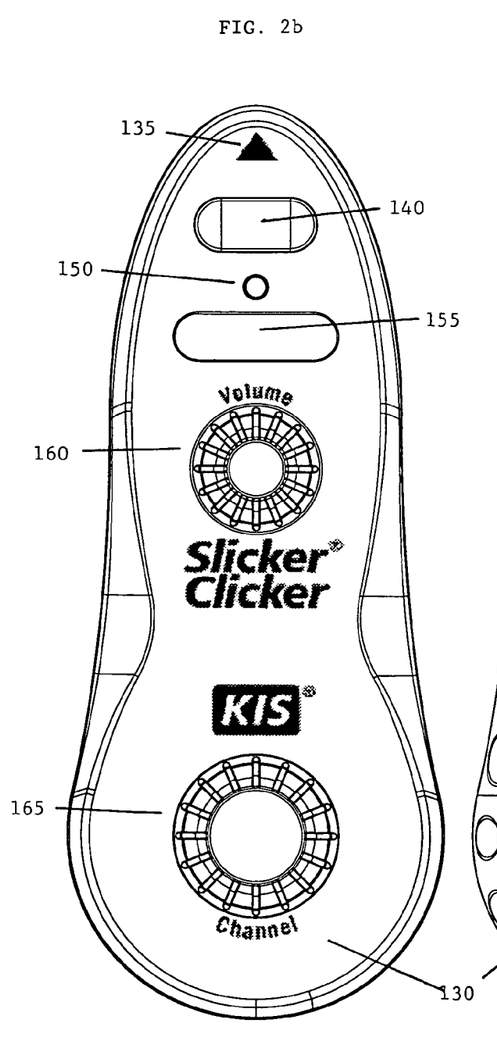
FIG. 2B is a top view of the remote control device of FIG. 2A.
Figure 2C:
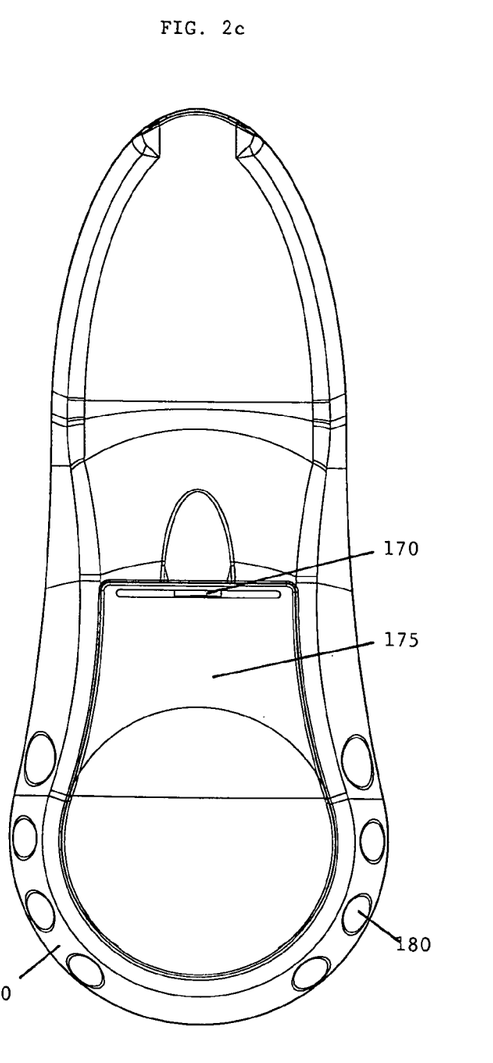
FIG. 2C is a bottom view of the remote control device of FIG. 2A.
Figure 2D:
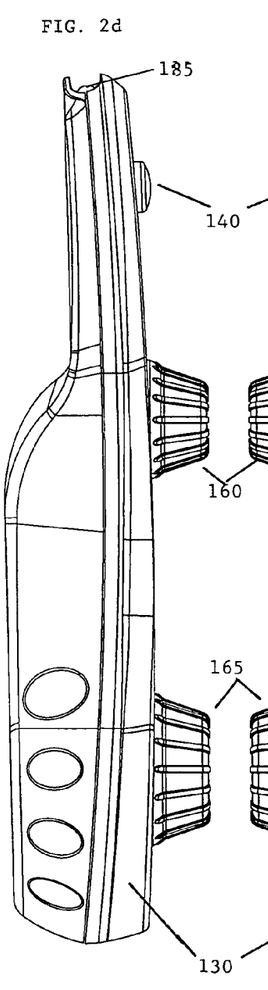
FIG. 2D is a left side view of the remote control device of FIG. 2A.
Figures 2E, 2F, 2G:
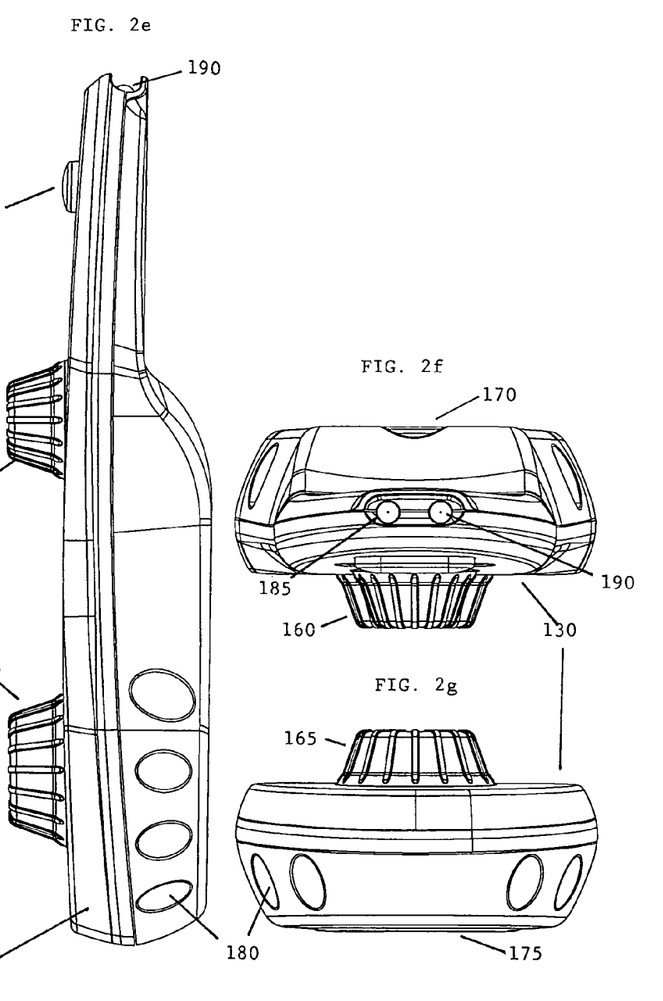
FIG. 2E is a right side view of the remote control device of FIG. 2A.
FIG. 2F is a front view of the remote control device of FIG. 2A.
FIG. 2G is a rear view of the remote control device of FIG. 2A.

Slicker Clicker® Remote Control Device with Two Control Knobs an On/Off Switch and Fluted Grip FIG. 2A is a top perspective view of another embodiment of a remote control device 102 which features luminescent channel knobs 160 and 165 for channel and volume control and a single luminescent "On/Off" button 140. FIG. 2B is a top view of the remote control device 102. FIG. 2C is a bottom view of the remote control device 102. FIG. 2D is a left side view of the remote control device 102. FIG. 2E is a right side view of the remote control device 102. FIG. 2F is a front view of the remote control device 102. FIG. 2G is a rear view of the remote control device 102.

This embodiment is similar to the embodiment described above.

In this embodiment, the television On/Off control feature is a single On/Off button rather than separate buttons for On/Off. In other examples, one or more knobs or other control features may be used to turn the television on or off.

In this embodiment, the rear portion of the housing 132 includes a plurality of indentions or flutes that are designed to be gripped between the thumb and fingers in order to align the control device. The foot end is larger that the head end to fit the hand and provide a more pointed profile. An arrow 135 is provided on the top portion of the housing to indicate the pointing direction of the device. An LED 150 is provided to indicate when the device is in communication with a television or other remote control device. In this example, the channel control knob 165 is larger than the volume control knob 160. The channel control knob 165 is positioned to the rear of the volume control knob 160. In this example, the reset button (not shown) is located in the battery compartment, and can be accessed by opening the battery compartment door 175. In this example, the top portion of the housing is secured to the bottom portion with snap catches on the front end and with screws on the rear portion which are located in the battery compartment.

Figure 3A:
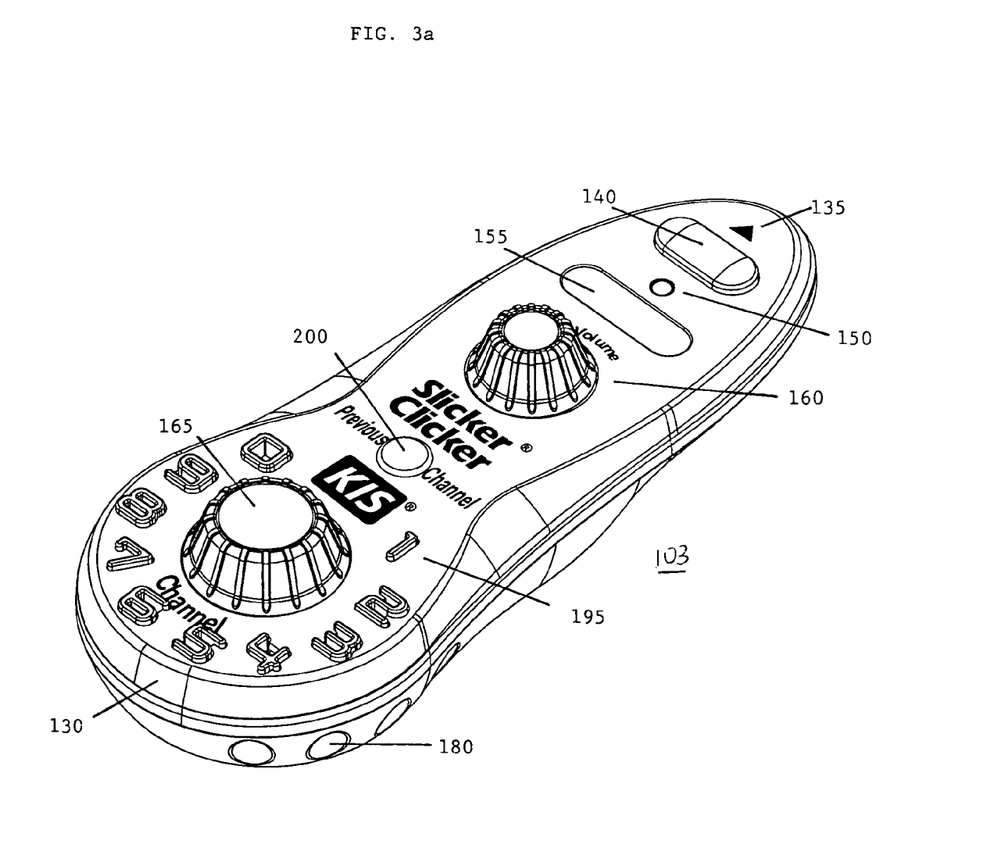
FIG. 3A is a top perspective view of an embodiment of a remote control device which features luminescent channel knobs for channel and volume control, a luminescent "On/Off" button, a previous channel button, an LED indicator, and oversized luminescent raised channel numbers.
Figure 3B:
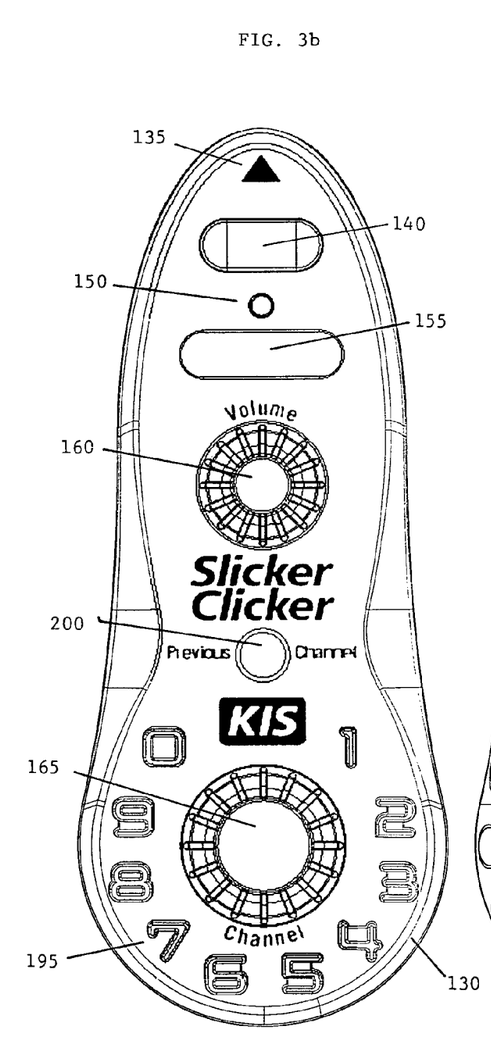
FIG. 3B is a top view of the remote control device of FIG. 3A.
Figure 3C:
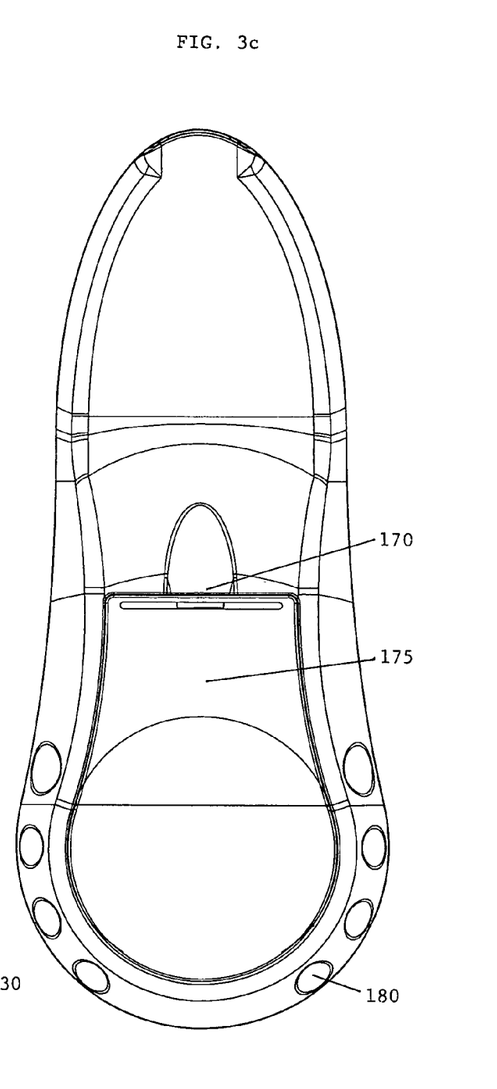
FIG. 3C is a bottom view of the remote control device of FIG. 3A.
Figures 3D, 3E:
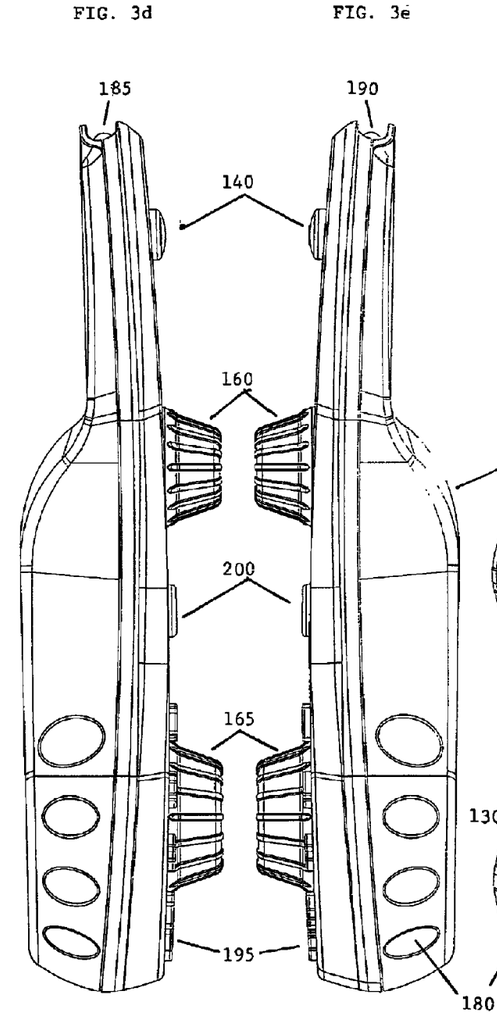
FIG. 3D is a left side view of the remote control device of FIG. 3A.
FIG. 3E is a right side view of the remote control device of FIG. 3A.
Figure 3F:
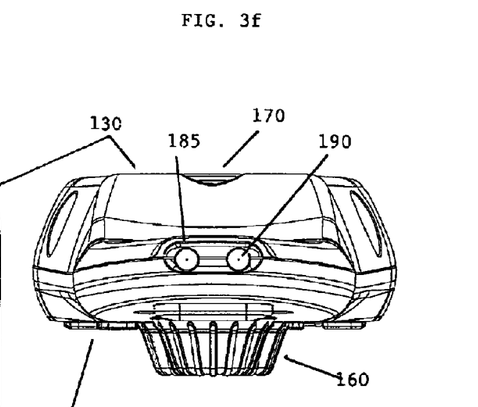
FIG. 3F is a front view of the remote control device of FIG. 3A.
Figure 3G:
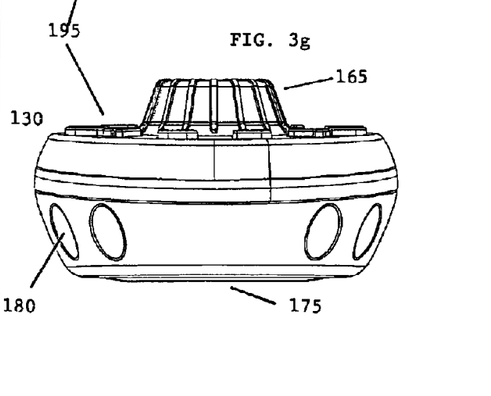
FIG. 3G is a rear view of the remote control device of FIG. 3A.

Slicker Clicker® Remote Control Device with Raised Numerals for Channel Selection Buttons and Previous Channel Button FIG. 3A is a top perspective view of an embodiment of a remote control device 103 which features luminescent channel knobs 160 and 165 for channel and volume control, a luminescent "On/Off" button, a previous channel button, an LED indicator, and oversized luminescent raised channel number buttons 195. FIG. 3B is a top view of the remote control device 103. FIG. 3C is a bottom view of the remote control device of 103. FIG. 3D is a left side view of the remote control device 103. FIG. 3E is a right side view of the remote control device 103. FIG. 3F is a front view of the remote control device 103. FIG. 3G is a rear view of the remote control device 103.

This embodiment is similar to the embodiments described above.

In this embodiment, a luminescent previous channel button 200 is provided on the top portion of the housing 107. This button returns the last-entered channel from the one currently on display.
Television Controls In this example, ten numeral buttons 195 for "1", "2", "3", "4", "5", "6", "7", "8", "9", and "0" are arrayed in a circular fashion, reminiscent of a rotary phone, around the channel control knob 165. In this embodiment, the numerals are not presented as rows, such as is common in mobile phones, calculators and computer keyboards. This arrangement is adopted because of the improved ease of locating a particular number in the rotary array. In one example, the numeral buttons are luminescent and are raised so that they can be felt by the user. In other examples, the numeric buttons may be provided as a keypad or in other layouts.

In this embodiment, channels may be selected by turning the knob clockwise or counterclockwise to sequence through the favorite channels as setup on the television or VCR. Channels may also be selected by depressing the numeric buttons. Proprietary software in the device determines whether the channel number entered by the user consists of one, two or three digits. Leading zeros are not required and are ignored, that is, both "07" and "7" are both accepted as channel 7.
Learning Mode In general, the learning mode for this embodiment is similar to the learning mode that is described above. In this example, there is an additional portion of the learning mode where the user sequentially presses the numbers 1 through 0 on the old remote device so that control device 103 can learn those numbers.

Slicker Clicker® Remote Control Device with Diary

In this embodiment, proprietary software is provided for a personal computer to create a diary of the channel numbers for favorite programs to be loaded into the Slicker Clicker. The diary software displays a table or matrix comprised of a seven-day calendar (X axis) and 24-hour viewing periods (Y axis), or alternatively subdivided into 48 half-hour periods. Initially, a default channel number, such as for a familiar 24-hour news channel, is entered in all day/time segments of the table. However, each segment in the table accepts a replacement entry of a desired channel number for a day/time preference. When completed or edited, the diary is saved in the personal computer and downloaded into the Slicker Clicker's memory via a USB port.

In this example, the device has a radio receiver capable of automatically receiving the current date and time as broadcast by station WWV or its counterpart outside the U.S.

When the television is turned on, the Slicker Clicker's internal software determines the correct day and time and automatically displays or accesses the television channel called for in the diary. For example, if the user turned on the television between 5:00 and 5:59 p.m. on Wednesday, the diary would determine that the preferred program at that day and time is on channel 39 and shift automatically to that channel. At 6:00 p.m., the television would automatically shift to the channel as specified in the diary.

In this example, at any time while the television is operating, that is, when a diary selected channel is engaged and displayed for the user, the channel selection knob may be used to intervene and select a different channel during the current day/time period. In this example, when the subsequent day/time period arrives, the automatic channel selection will re-engage, and the television will display the channel specified for that day/time period. Alternatively, the automatic diary selection mode may be reengaged by turning the Slicker Clicker off, and back on.

This embodiment is particularly suited for persons with cognitive deficiencies or related memory impairment.

What is claimed is:

1. A simplified television remote control device comprising
  a housing including
    a top surface,
    a bottom surface,
    a front end, and
    a rear end larger than the front end such that a user can determine the orientation of the housing by feel;
  a luminescent television volume control knob positioned on the top surface of the housing;
  a luminescent television channel control knob positioned on the top surface of the housing, such that the channel control knob is a different size from the volume control knob, such that a user can distinguish between the channel control knob and the volume control knob by feel;
  at least one television On/Off control feature; and
  a wide-angle infrared emitter positioned in the front end of the device housing.

2. The television remote control device of claim 1 wherein the housing is tapered such that the front end of the housing is narrower than the rear end of the housing.

3. The television remote control device of claim 1 further comprising
  an LED indicator, such that the LED indicator is illuminated when the control device is in communication with a television or other control device.

4. The television remote control device of claim 1 further comprising
  a previous channel control button.

5. The television remote control device of claim 1 further comprising
  a plurality of luminescent number buttons.

6. The television remote control device of claim 5 wherein the plurality of luminescent numbers are raised with respect to the top surface of the housing.

7. The television remote control device of claim 1 wherein
  the television channel control knob is larger than the television volume control knob; and
  the television volume control knob is positioned between the television channel control knob and the front end of the control device housing.

8. The television remote control device of claim 1 further comprising
  a photo diode positioned in the front end of the device housing.

9. The television remote control device of claim 1 further comprising
  a plurality of flutes provided in the proximity to the rear end of the device housing.

10. The television remote control device of claim 1 further comprising
  a recessed label area, and
  a label indicating a room name.

11. A method of using a simplified television remote control device to control a television, the method comprising
  providing a simplified television remote control device comprising
    a housing comprising
      a top surface,
      a bottom surface,
      a front end comprising
        a wide-angle infrared emitter, and
        a photo diode, and
      a rear end,
    a television volume control knob positioned on the top surface of the housing,
    a television channel control knob positioned on the top surface of the housing, and
    at least one television On/Off control feature;
  learning from an old control device for the television how to operate the television with the simplified television remote control device by
    placing the old control device in a nose-to-nose alignment about 6 inches apart from the simplified television remote control device,
    pressing, in a specified sequence, control features on the old control device, the control features including
      television on,
      television off,
      channel up,
      channel down,
      volume up, and
      volume down,
    determining with the simplified television remote control device the infrared control signals necessary to
      command television on or off,
      command channel up and channel down, and
      command volume up and volume down,
    associating the command television on or off control signals with the television On/Off control feature,
    associating the command channel up with a clockwise rotation of the channel control knob,
    associating the command channel down with a counter-clockwise rotation of the channel control knob,
    associating the command volume up with a clockwise rotation of the volume control knob, and
    associating the command volume down with a counter-clockwise rotation of the volume control knob; and
  using the simplified television remote control device by
    turning the television on with the television On/Off control feature,
    changing channel with the television channel control knob, and
    changing volume with the television volume control knob.

12. The method of claim 11 further comprising
  providing a plurality of numeric buttons on the simplified television remote control device; and
  sequentially depressing a portion of the numeric buttons to enter a desired channel number.

* * * * *